Patented Oct. 25, 1932

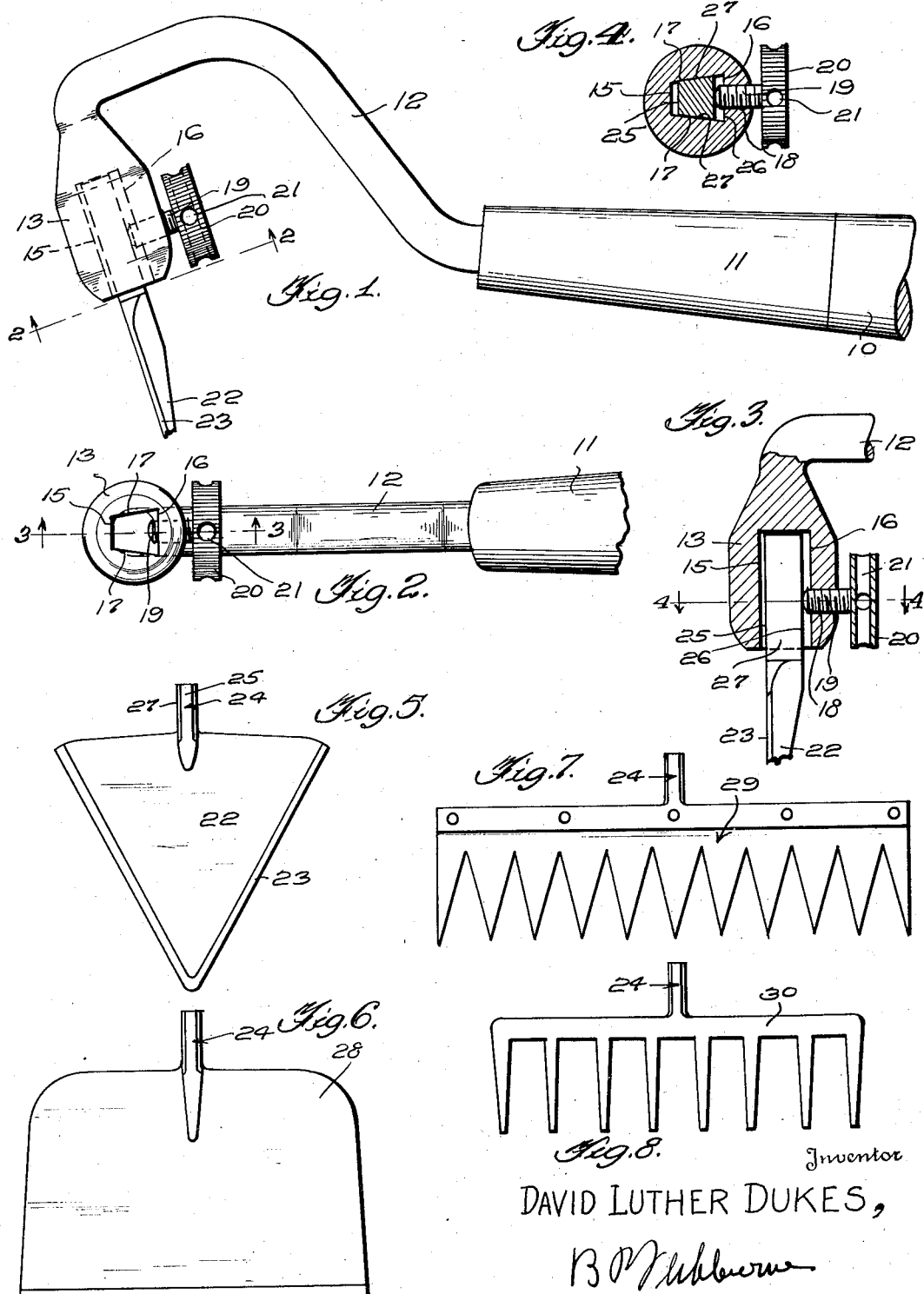

1,885,089

UNITED STATES PATENT OFFICE

DAVID LUTHER DUKES, OF ST. GEORGE, SOUTH CAROLINA

MANUALLY OPERATED GROUND WORKING IMPLEMENT

Application filed February 19, 1932. Serial No. 594,075.

My invention relates to improvements in manually operated ground working implements.

In accordance with my invention, I provide a device of the above-mentioned character embodying a handle, preferably of the length of the ordinary hoe or rake handle, to the forward end of which is permanently attached a rod, preferably bent into the form of a goose-neck, and this rod carries, at its free end, a socket, preferably integral therewith. For use in connection with this handle, I provide a plurality of ground-engaging elements, such as a hoe blade, a cultivator blade, or rake. These elements have relatively short shanks for insertion within the socket. The shape of the bore of the socket and the shape of the shank is such that these parts may have firm clamping engagement, yet may be readily separated or freed from each other, in the event that they should become bound together by rusting, or the like. Clamping means is provided for co-action with the socket and shank, and is preferably correlated with the same, not only to effect the proper clamping co-action between these parts, but to be protected, and to be positioned preferably at the rear of the socket in an out-of-the-way location.

In the accompanying drawing, forming a part of this specification, and in which like numerals are employed to designate like parts throughout the same, Figure 1 is a side elevation of an implement embodying my invention, parts being broken away, Figure 2 is an end elevation of the socket and associated elements, as viewed from the line 2—2 of Figure 1, Figure 3 is a detail section taken on line 3—3 of Figure 2, Figure 4 is a horizontal section taken on line 4—4 of Figure 3, Figure 5 is a side elevation of a cultivator blade, Figure 6 is a similar view of a hoe blade, Figure 7 is a similar view of a different type of cultivator blade, and Figure 8 is a similar view of a rake head.

In the drawing, wherein for the purpose of illustration is shown a preferred embodiment of my invention, the numeral 10 designates a handle, preferably formed of wood, and having a length corresponding to the usual length of the ordinary hoe or rake handle. This handle may be equipped at its forward end with a ferrule 11, and a connecting rod 12 is permanently and rigidly attached to the forward end of the handle 11, within the ferrule 11. This connecting rod is bent upwardly into the form of a goose-neck, and has a socket 13 rigidly attached to its free end, and preferably formed integral therewith. The socket extends generally transversely of the handle 10 and is arranged at an angle with relation thereto, and the goose-neck 12 supports the socket so that its free end is generally in the elevation of the handle. The socket 13 is preferably cylindrical and tapers toward its free end and has a bore 14. This bore has forward and rear side walls 15 and 16, which are preferably parallel, and side walls 17, which converge forwardly. The bore is, therefore, tapered forwardly in horizontal cross-section. The socket 13 is provided at the rear wall 16, with a screw-threaded opening 18, extending through the rear side of the socket, and this screw-threaded opening receives a clamping or set-screw 19, having a head 20 formed integral therewith. This head preferably has a diameter substantially equal to the diameter of the socket 13. The head 20 has its periphery milled so that it may be conveniently turned by the fingers and this head also has diametrically extending openings 21 formed therein, and extending through opposite surfaces of the head. The function of these openings is to permit of the insertion of a nail, or the like, into the same, to aid in turning the clamping screw, when desired. Particular attention is called to the fact that the outer end of the clamping screw and its head 20, are positioned at the rear of the socket, within or beneath the goose-neck 12. This location leaves the forward side of the socket 13 free from any obstructions, which might interfere with the manipulation of the device.

In Figure 5, I have shown a ground-engaging element, in the form of a cultivator blade 22. This blade may be triangular and tapers forwardly, and is provided with sharp, cutting edges 23. Secured to the upper end of this blade is a shank 24, preferably integral therewith. As clearly shown in Figure 4, this shank tapers forwardly in horizontal cross section, having forward and rear parallel end walls 25 and 26, and side walls 27, which converge forwardly. The converging side walls 27 are arranged for wedging engagement with the side walls 17 of the bore 14, while the forward and rear walls 25 and 26 are spaced from the walls 15 and 16, when the screw 19 has clamping engagement therewith, as clearly shown in Figure 4.

In Figure 6, the shank 24 is shown as rigidly secured to a ground-engaging element 28, in the form of a hoe blade.

In Figure 7, the shank 24 is rigidly secured to a toothed cultivator blade 29.

In Figure 8, the shank 24 is rigidly secured to a rake head 30.

In the use of the device, the desired ground-engaging element is selected, and the shank 24 inserted within the bore 14 of the socket. The screw 19 is then suitably turned to clamp against the rear wall 26 of this shank, thereby forcing the forwardly converging walls 27 of the shank into clamping engagement with the forwardly converging walls 17 of the bore. This screw engages the shank at a point substantially equi-distantly spaced from its ends, and due to the forward transverse wedging action of the shank with the walls of the bore of the socket, there is no possibility of the shank shaking or rattling within the socket. Implements of this character are frequently left out of doors and parts rust. If the shank 24 should rust within the socket, the contacting walls might become locked together. This lock can be readily broken by loosening the screw 19, and then striking the forward side of the ground-engaging element upon the ground, the inclined or converging walls and the spacing of the parallel wall permitting of the breaking of the lock, and the shank will then freely fall from within the bore of the socket, as it will then have a loose fit within this bore. When the cultivator blade 32 is used, it may be employed as a hoe blade, by turning the entire device upon its side. Particular attention is called to the fact that each ground-engaging element carries only a relatively short shank, and that the gooseneck 12 and socket secured to its forward end is used in connection with all of the ground-engaging elements. This simplifies the construction of the device and reduces the cost of production.

The device is extremely simple in construction and may be produced at a minimum cost.

The invention is in no sense restricted to the use of the precise forms of ground-engaging elements shown, which are given for the purpose of illustration.

It is to be understood that the form of my invention herewith shown and described is to be taken as a preferred example of the same, and that various changes in the shape, size and arrangement of parts may be resorted to without departing from the spirit of my invention or the scope of the subjoined claims.

Having fully described my invention, what I claim is:

1. A ground working implement, comprising a handle, a connecting rod secured to the forward end of the handle, a metal socket rigidly attached to the connecting rod and having a bore, said bore having a uniform cross-sectional area throughout its length and parallel forward and rear walls and forwardly converging side walls, said socket having a screw-threaded opening in its rear portion passing through the rear wall, a clamping screw arranged within the screw-threaded opening and extending to the exterior of the rear side of the socket, and a ground-engaging element having a metal shank, said shank having a uniform cross-sectional area throughout its length and parallel forward and rear walls and forwardly converging side walls, the shank being adapted for insertion within the bore of the socket so that its forwardly converging side walls engage the forwardly converging side walls of the bore and the forward and rear walls of the shank are permanently spaced from the forward and rear walls of said bore, said screw engaging the rear wall of the shank and forcing the converging walls of the shank into wedging engagement with the converging walls of said bore, the arrangement being such that when the screw is manipulated to disengage the rear wall of the shank, the engagement between the side walls of the socket and shank may be readily broken by forcing or striking the ground engaging element in a forwardly direction upon the ground.

2. A device of the character described, comprising a handle and bent into a gooseneck, a connecting rod secured to the forward end of the handle, a metal socket rigidly attached to the connecting rod and having a bore said socket having its longitudinal axis extending transversely of the handle, said bore having parallel forward and rear walls and forwardly converging side walls, said socket having a screw-threaded opening in its rear portion passing through the rear wall, a clamping screw arranged within the screw-threaded opening and extending to the exterior of the rear side of the socket, a ground-engaging element having a metal shank, said shank having parallel forward and rear walls and forwardly converging side walls, the shank being adapted for insertion within the bore of the socket so that its forwardly converging side walls engage the forwardly converging side walls of the bore and the forward and rear walls of the shank are permanently spaced from the forward and rear walls of said bore, said screw engaging the rear wall of the shank and forcing the converging walls of the shank into wedging engagement with the converging walls of said bore, and a head secured to the rear end of the clamping screw and having an opening formed therein to receive a nail or the like said head being arranged beneath the goose-neck and within the space formed by the goose-neck and socket, the arrangement being such that when the screw is adjusted to disengage the rear wall of the shank, the engagement between the converging side walls of the shank and the socket may be readily broken by forcing or striking the ground engaging element upon the ground in a forwardly direction.

In testimony whereof, I affix my signature.

DAVID LUTHER DUKES.